Aug. 25, 1953  S. J. O'NEIL  2,649,809
TUMBLEPROOF, SPILLPROOF, OR GIMBAL-LOCK-FREE GYRO
Filed Oct. 25, 1951  2 Sheets-Sheet 1
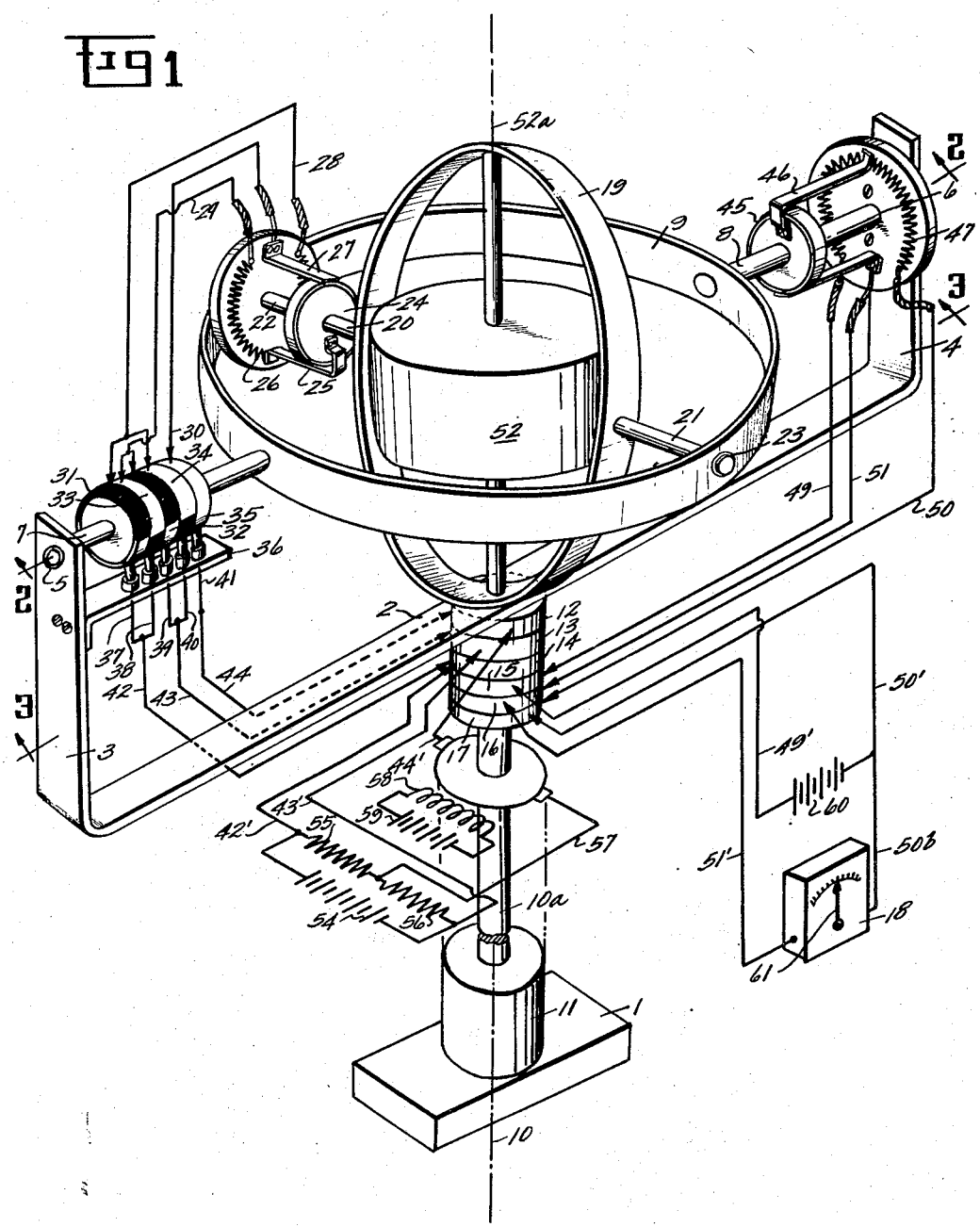
INVENTOR.
STEPHEN J. O'NEIL
BY
ATTORNEYS

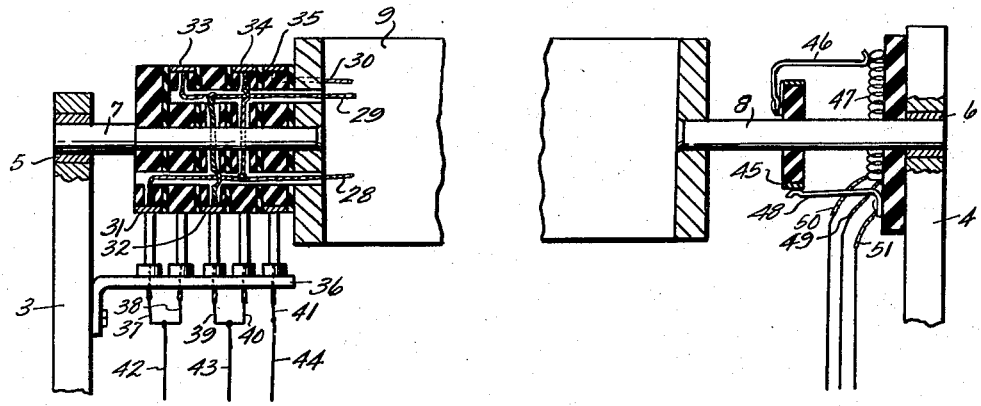
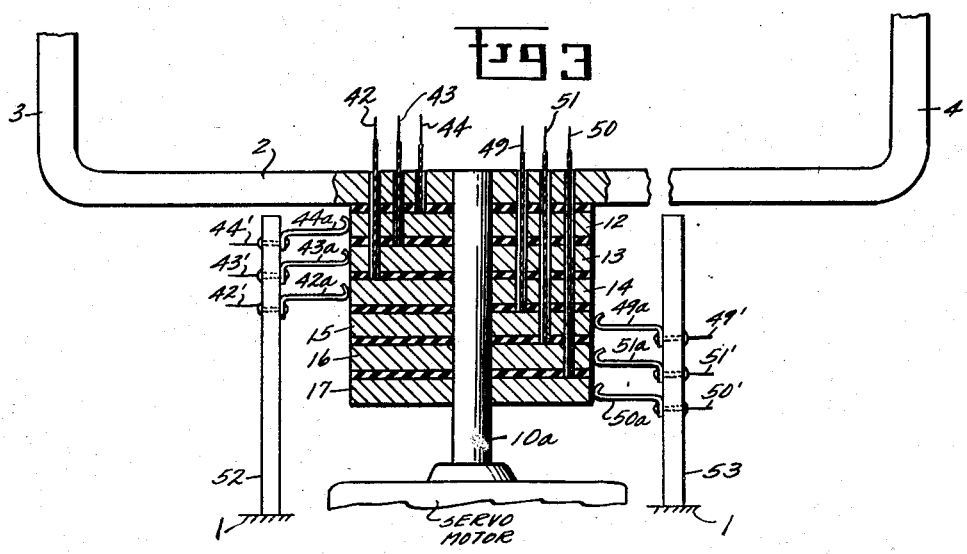

Patented Aug. 25, 1953

2,649,809

UNITED STATES PATENT OFFICE 2,649,809

TUMBLEPROOF, SPILLPROOF, OR GIMBAL-LOCK-FREE GYRO

Stephen Joseph O'Neil, Lexington, Mass.

Application October 25, 1951, Serial No. 253,186

8 Claims. (Cl. 74—5.2)

(Granted under Title 35, U. S. Code (1952), sec. 266)

The invention described herein may be manufactured and used by or for the Government for governmental purposes without payment to me of any royalty thereon.

This invention relates to gyroscopes and more particularly to free gyroscopes having a two axis suspension, such as a Cardan suspension which is free from gimbal lock, gimbal lock being defined as that condition which exists when the body or frame which supports the outer gimbal of the gyroscope rotates through such an angle about the inner gimbal axis that the spin axis of the rotor of the gyroscope and the outer gimbal axis are disposed in the same direction. In this position it is possible to cause the rotor spin axis to precess or change its direction in space by causing the outer gimbal axis supporting frame to rotate about some axis other than the gyro axis, for example, the axis normal to both the inner and outer gimbal axes, this precessing under these conditions being known as "tumbling" or "spilling."

In the present invention means are provided for rotating the supporting frame for the outer gimbal in such a manner, about an axis normal to the outer gimbal axis, so as to always prevent the outer gimbal axis and the rotor spin axis from moving into alignment, thus preventing gimbal lock.

In carrying out the invention a reversible servomotor is provided to rotate the supporting frame for the outer gimbal to always tend to dispose the outer gimbal axis normal to the rotor spin axis and includes signal pick-off means between the inner and outer gimbals, preferably between the inner gimbal axis and the outer gimbal frame for energizing the servomotor means to rotate the outer gimbal supporting frame through an angle having a definite relation to relative tilt of the rotor spin axis to the outer gimbal frame axis, such as to always shift the outer gimbal frame axis into a position normal to the rotor spin axis, the invention also employing signal pick-off means between the outer gimbal supporting frame and the outer gimbal, for producing a signal which is proportional to the angular displacement between the rotor spin axis and the supporting axis of the outer gimbal supporting frame.

A further object is the provision of direction sensing signal pick-off means between the inner and outer gimbal means for energizing the servomotor means to rotate the outer gimbal supporting frame in a predetermined direction upon relative displacement between the rotor spin axis and the outer gimbal tilt axis in a predetermined direction.

A further object is the provision of means incorporated in the tilt signal pick-off means between the inner and outer gimbal for energizing the servomotor means to rotate the same at a rate proportional to the relative angular displacement between the outer gimbal tilt axis and the rotor spin axis.

A further object is the provision of tilt signal pick-off means between the outer gimbal supporting frame and the outer gimbal for producing a variable signal which is proportional to the relative angular displacement between inner gimbal frame tilt axis and the outer gimbal supporting frame rotative axis in a plane passing through the inner gimbal tilt axis and the rotative axis of the outer gimbal supporting frame, including signal means operable thereby for determining the magnitude of the tilt of the outer gimbal supporting frame relative to the direction of the rotor spin axis.

Other objects and advantages of the invention will become more apparent from the accompanying drawing and following description in which like reference characters refer to like parts in the several figures—

Figure 1 is a somewhat diagrammatic perspective view of a gyroscope illustrating my invention, and incorporating a simplified schematic wiring diagram;

Figure 2 is a vertical, fragmentary sectional view taken approximately one line 2—2 of Figure 1, illustrating more clearly the semicircular contact segments and slip rings fixed for rotation with the outer gimbal, forming a part of the tilt direction sensing means for determining the direction of rotation of the servomotor means and the potentiometer device between the outer gimbal axis and the outer gimbal supporting frame;

Figure 3 is an enlarged fragmentary vertical sectional view taken approximately on a plane passing through the outer gimbal tilt axis and the outer gimbal frame rotary support axis and indicated at 3—3 in Figure 1, showing the slip ring arrangement carried by the outer gimbal supporting frame on the rotative axis thereof.

Referring to Figure 1, the reference numeral 1 denotes a support which is subject to tilting displacements, the support 1 having journalled thereon an outer gimbal supporting means or rotative frame 2, having an axis of rotation which, as shown in the drawing, is perpendicular to the plane of the support 1. Since the support 1 is subject to angular displacements in space the U-shaped frame 2 and its rotative supporting axis is also subject to angular as well as rotative displacements in space. The main support 1 may be a part of a flying missile, aircraft, or dirigible vehicle of any desired known type.

The outer gimbal supporting frame 2 has a bifurcated form to provide spaced upstanding arms 3 and 4 having suitable aligned bearings 5 and 6 in which are journalled the pivots or shafts 7 and 8 of an outer gimbal member 9. The rotative axis of the outer gimbal support 2 is indicated at 10 and is suitably journalled in the main support 1 and lies in a common plane with the axes of the two short outer gimbal shafts 7 and 8, permitting the outer gimbal frame 9 to tilt freely in a plane normal to a plane passing through the axis of the gimbal supporting frame 2.

The axis 10 of the gimbal supporting frame 2, comprises a short supporting shaft 10a projecting outwardly and suitably journalled on the main support 1, and connected to a servomotor means 11, either direct or through a train of gearing (not shown). The servomotor 11 is reversable and conventional and when energized is arranged to rotate the gimbal support 2 in one direction or the other about the axis 10, depending upon the direction of the energizing potential.

Fixed on and individually insulated from the supporting shaft 10a of the gimbal support 2, and each other, are a plurality of slip rings 12, 13, 14, 15, 16 and 17 for establishing electrical circuit connections to the servomotor and the tilt signal indicator 18. Journalled within the outer gimbal 9 on axis perpendicular to the outer gimbal supporting axis (axis of shafts 7 and 8), is an inner gimbal or Cardan frame 19 having supporting axles or shafts 20 and 21 journalled at 22, 23 in suitable bearings carried by the outer gimbal frame 9.

The shaft 20 carries an insulated slip ring 24 fixed thereto having a wiper arm 25 for engaging the coils of a potentiometer 26 fixed to and insulated from the outer gimbal ring 9 and concentrically surrounding the inner gimbal tilt axis. A contact brush 27 engages the periphery of the slip ring 24 and is fixed to and insulated from the outer gimbal 9. The end terminals of the potentiometer 26 and the brush 27 are connected by electrical conductors 28, 29 and 30 respectively to four semicircular staggered contact segments 31, 32, 33, 34 and a slip ring 35, fixed on and insulated from the shaft 7 for the outer gimbal 9, best seen in Figure 2. The contact segments 31 and 32 are connected to the conductor 28 and extend half-way around one side of the shaft 7 in spaced parallel relation to each other while the contacts 33 and 34 are connected to the conductor 29 and extend half way around the other side of the shaft 7 in spaced parallel relation as shown in Fig. 2, the extremities preferably being in a plane passing through the tilt axes of the outer and inner gimbal members 9 and 19. The slip ring 35 is connected to the conductor 30.

The outer gimbal support 2 carries on the arm 3 thereof a support or bracket 36 which carries insulated brushes 37, 38, 39, 40 and 41 disposed for engagement respectively with the contact segments 31, 33, 32, 34 and the slip ring 35. The brushes 37 and 38 having a common electrical conductor 42 connected thereto. The brushes 39 and 40 have a conductor 43 connected thereto while the brush 41 is connected to the conductor 44.

Fixed to the opposite outer gimbal shaft 8 is an insulated slip ring 45 having a potentiometer contact arm 46 which engages the potentiometer coil 47 carried by and insulated from the upstanding arm 4 of the gimbal supporting frame 2. An insulated brush contact 48 is carried by the arm 4 and engages the periphery of the slip ring 45. The extremities of the potentiometer 47 and the brush 48 are connected respectively by the three conductors 49, 50 and 51 which are connected to the lower three slip rings 15, 17 and 16.

Located on the main support 1 below the outer gimbal ring 2 are two fixed standards or bracket arms 52 and 53. The arm 52 carries three brushes 42a, 43a and 44a to which are connected the electrical circuit conductors 42', 43' and 44', thus the slip rings 12, 13 and 14, form extensions of the conductors 42, 43 and 44.

The standard 53 carries three contact arms 49a, 50a and 51a to which are connected the electrical conductors 49', 50' and 51' forming, through the slip rings 15, 16 and 17, extensions respectively of the conductors 49, 50 and 51.

The conductors 42' and 43', as seen in Figure 1, are connected to the opposite end terminals of a current source or battery 54 with the two interconnected resistances 55 and 56 shunt connected to the wires 42' and 43', and a conductor 57 is connected to the shunt intermediate the resistances 55 and 56. The conductors 44' and 57 are connected to the brushes for the servomotor 11 while the fixed field 58 of the servomotor 11 is supplied from a current source or battery 59. The conductors 49' and 50' are connected to the opposite terminals of a current source or battery 60 while the conductor 51' is connected to one side of the tilt signal indicator or tilt control device 18, a conductor 50b connects the circuit wire or conductor 50' to the other terminal of tilt signal or control device 18.

Located within the inner gimbal 19 is the gyroscope rotor 52 having its spin axis 52a normal to the inner gimbal tilt axis, in a plane passing through the outer gimbal tilt axis. The rotor 52 is shown in its simplest form for clearness. In actual practice the rotor will be power driven in the conventional manner either by vacuum or by an electric motor with an appropriate conventional electrical wiring circuit, not forming a part of the subject invention and therefor not shown.

*Operation*

When the main support 1, on which the improved gyroscope is mounted, becomes tilted from the position shown, the spin axis of the rotor 52 remains fixed in space. If this tilt is around the axis of the outer gimbal in a plane passing through the inner gimbal axis, the servomotor 11 is not energized since a gimbal lock position is not approached. The brush 46 from the slip ring 45 shifts relative to the potentiometer coil 47, unbalancing the energizing circuit to the tilt signal device 18, causing the indicator hand 61 to indicate the tilt and/or angular displacement of the support 1 relative to the rotor spin axis 52a. This tilt causes the brushes 37, 38 39 and 40 to be displaced around the semicircular contact elements 31, 32, 33 and 34 which form a current reversing switch between other potentiometer coil 26 and the servomotor control device 11. The potentiometer brush 25 remaining in the same intermediate position on the potentiometer coil 26 does not vary the signal strength to the servomotor 11 and the outer gimbal supporting frame 2 remains at rest.

If the tilt of the main support 1, however, includes a tilt component about the inner gimbal axis, the potentiometer brush 25 will become shifted toward one or the other ends of the potentiometer coil 26 and through the reversing switch device unbalances the servomotor circuit and the servomotor 11 will operate to rotate the outer gimbal support in the desired direction to bring the outer gimbal axis perpendicular to the rotor spin axis, again moving the potentiometer brush 25 to balance the servomotor control circuit and the servomotor will stop. The reversing switch device determines direction of movement of the outer gimbal and inner gimbal axes to bring the outer gimbal axis perpendicular to the rotor spin axis through the smallest degree of angular movement of the outer gimbal support 2.

If the support 1 is tilted about the axis of the inner gimbal, for instance, in a direction to raise the arm 3 and lower the arm 4 from the position shown in Figure 1 the inner gimbal 19 will remain fixed in space. The potentiometer coil 26 will be shifted relative to the brush contact 25 and the servomotor circuit will be unbalanced to energize the servomotor to rotate the outer gimbal support 2, about the axis of the shaft 10 and displace the tilt axis of the outer gimbal, in the now tilted plane of the outer gimbal, until the outer gimbal axis is again perpendicular to the rotor spin axis 52a and the servomotor will then come to rest until some further angular displacements take place. The outer gimbal 9 will now, of course, be in a tilted plane relative to the rotor spin axis 52a although the rotor spin axis and outer gimbal tilt axis will be in perpendicular relation to each other. If a change in tilt now occurs to displace the plane of the outer gimbal in another tilt plane relative to the rotor spin axis, the servomotor must be now operated to rotate the outer gimbal supporting frame 2 in the proper direction around the axis 10 to return the outer gimbal tilt axis again to its perpendicular relation to the rotor spin axis 52a through the smallest angular displacement possible. This direction of movement is controlled by the reverse switch device including the contact segments 31 to 35 and contacts 37 to 41. From any tilted position of the support 1 to another tilted position the outer gimbal axis will be displaced to always bring the outer gimbal tilt axis into perpendicular relation to the rotor spin axis. If the tilt is in one direction the outer gimbal supporting frame is rotated in one direction to bring the outer gimbal axis and rotor spin axis in perpendicular relation again. If the tilt is such as to pass from an angular relation between the outer gimbal axis and rotor spin axis at one side of a plane perpendicular to the rotor spin axis to the other side of the same plane the reversing switch, due to the shifting of the brushes 37 to 40 relative to the segmental contacts 31 to 34 reverses the current in the conductors 42 and 43 and the direction of the servomotor is reversed, always rotating the outer gimbal support through the smallest arc to dispose the outer gimbal axis perpendicular to the rotor axis 52a.

The signal pick-off potentiometer 47 energizes the tilt signal indicator 18 to indicate the relative tilt between the plane of the outer gimbal 9 and the rotor spin axis 52a, or the angle between the axis 10 located in the main support and the gyro spin axis 52a.

This signal pick-off, instead of operating the signal indicator 18 can be connected to a servomotor device, which in turn can be connected to a tilt control device such as an elevator or ailerons, or rudder of an aircraft to actuate the same in proportion to the tilt signal to bring the support back to a level relation again.

I claim:

1. In a non-tumbling gyroscope device, a rotatable outer gimbal support adapted to be carried by a vehicle subject to tilt displacements and having an axis fixed relative to the vehicle; an outer gimbal journalled in the outer gimbal support for tilt displacements about an axis perpendicular to the outer gimbal support axis; an inner gimbal tiltably journalled in the outer gimbal for tilt displacements about an axis perpendicular to the outer gimbal tilt axis in a plane including the rotary outer gimbal support axis; a gyroscope rotor mounted to spin in the inner gimbal on a spin axis in a plane perpendicular to the outer gimbal tilt axis; servomotor means for selectively rotating the outer gimbal support about its axis; an electrical energizing circuit for the reversable servomotor means to energize the same; signal pickoff means between the inner and outer gimbals connected in the energizing circuit for energizing the circuit incident to tilting displacement between the inner and outer gimbals to rotate the outer gimbal support about its rotative axis to dispose the outer gimbal tilt axis perpendicular to the rotor spin axis; signal pick-off means between the outer gimbal and outer gimbal support including an energizing circuit; and tilt indicating means operable by said last mentioned energizing circuit incident to tilt displacements between the outer gimbal support and the outer gimbal for determining the magnitude of the last mentioned tilt displacement.

2. In a gyroscope of the class described; a rotor having a spin axis; an inner gimbal; journal means on the inner gimbal for supporting the rotor for rotation about its spin axis; an outer gimbal tiltably supporting the inner gimbal for tilt displacement about an axis intersecting the spin axis of the rotor in a plane perpendicular thereto; a rotatable outer gimbal support tiltably supporting the outer gimbal for tilt displacements about an axis intersecting the inner gimbal tilt axis perpendicular thereto; said rotatable outer gimbal support having a rotatable axis intersecting the outer gimbal tilt axis perpendicular thereto; servomotor means connected to the outer gimbal support for selectively rotating the support about its rotative axis in either direction to displace the outer gimbal tilt axis in either direction around the rotor spin axis, relatively shiftable cooperating movable servomotor energizing means comprising an electrical contact part carried by outer gimbal and a cooperating electrical contact part carried by the inner gimbal and an electrical energizing circuit connected to said contact parts to be selectively energized by tilt displacement between the outer and inner gimbals in one direction from a predetermined position, to energize the servomotor in one predetermined direction, and reversely energized by tilt displacement between the outer and inner gimbals from said predetermined position in the opposite direction to rotate the servomotor in the opposite direction, to selectively move the outer gimbal tilt axis into perpendicular relation to the rotor spin axis when the outer gimbal tilt axis is angularly displaced from a perpendicular relation to the rotor spin axis in one direction or an opposite direction.

3. Apparatus as claimed in claim 2 in which the cooperating contact parts on the outer and inner gimbals comprises a potentiometer coil carried by one of the gimbals and a slider contact arm cooperating with the coil, carried by the other gimbal.

4. Apparatus as claimed in claim 3, including current reversing switch means, including at least a pair of cooperating electrical current reversing relatively shiftable switch parts between the outer gimbal and the outer gimbal rotatable support, one of said cooperating current reversing switch parts being fixed to the outer gimbal and the other of said switch parts carried by the outer gimbal support and shiftable by relative tilt displacement in one direction or the other between outer gimbal support and the outer gimbal from a perpendicular relation between the inner gimbal tilt axis and the outer gimbal support rotative axis to control the direction of rotation of the servomotor means when energized by tilt displacement between the outer gimbal and the inner gimbal.

5. Apparatus as claimed in claim 4 including tilt determining means and signal pick-off means between the outer gimbal and outer gimbal support comprising a pair of relatively shiftable circuit controlling parts, one part being carried by the outer gimbal and the other by the outer gimbal support, tilt determining means including an energizing circuit therefor connected to said shiftable circuit controlling parts, including means energized by said last mentioned circuit incident to tilt displacement of the inner gimbal tilt axis from perpendicular relation to the outer gimbal support rotative axis in one direction or the other for energizing the last mentioned circuit to determine the direction of the last mentioned tilt displacement.

6. Apparatus as claimed in claim 5 in which the relatively shiftable circuit controlling parts between the outer gimbal support and the outer gimbal comprise a potentiometer coil and a contact slider in the circuit for energizing the circuit to the tilt determining means at a magnitude proportional to the degree of angular displacement of the rotative axis of the outer gimbal support relative to the tilt axis of the inner gimbal.

7. Apparatus as claimed in claim 6 including slip ring means between the outer gimbal support and the servomotor means and the tilt determining means for establishing electric circuit connections to the servomotor means from the aforesaid reversing switch parts and the shiftable circuit controlling parts during rotative adjustment of the outer gimbal support about its rotative axis.

8. In a non-tumbling gyroscope construction; a rotor having a spin axis; an inner gimbal; journal means therein for supporting the rotor for rotation about its spin axis; an outer gimbal tiltably supporting the inner gimbal for tilt displacement about an axis intersecting the spin axis of the rotor in a plane perpendicular thereto; a rotatable outer gimbal support, tiltably supporting the outer gimbal for tilt displacements about an axis intersecting the inner gimbal tilt axis perpendicular thereto; said rotatable outer gimbal support having a rotative axis intersecting the outer gimbal tilt axis perpendicular thereto; a support for the outer gimbal support adapted to be displaced in space, having means for supporting the outer gimbal support for rotative adjustments about its rotative axis; reversible servomotor means connected to the outer gimbal support for rotative adjustment thereof about its rotative axis; potentiometer means between the inner and outer gimbals including a potentiometer coil fixed to the outer gimbal and surrounding the inner gimbal tilt axis; a slip ring carried by the inner gimbal on its tilt axis; a slider contact fixed to the slip ring and engaging the coil; a contact brush carried by the outer gimbal in engagement with the slip ring; a slip ring carried by the outer gimbal on the tilt axis thereof; an electrical connection between the last mentioned slip ring and the contact brush; 2 pairs of semicircular contact segments carried by the outer gimbal on the tilt axis thereof in staggered opposed relation to alternately surround half of the tilt axis of the outer gimbal, an electrical connection between one pair of the said staggered semicircular contacts and one end of the potentiometer coil, an electrical connection between the other pair of said staggered semicircular contacts and the other end of the potentiometer coil, relatively insulated from the first pair of contacts and the slip ring, contact brushes carried by the outer gimbal support for selective contacting relation with the two pairs of semicircular contact segments and with the second mentioned slip ring, six relatively insulated slip rings carried by the outer gimbal support in surrounding relation to its rotative axis, an electrical circuit connection between the slip ring on the outer gimbal and one of the slip rings on the outer gimbal support; an electrical connection between the brushes for each pair of semicircular contacts and one of the slip rings on the outer gimbal support; separate brush contacts between the support for the outer gimbal support and the slip rings to which the pairs of semicircular contact segments are connected; said reversible servomotor means having a stationary field and energizing means therefor, and an armature having a commutator; an electrical connection between the slip ring on the outer gimbal support to which the slip ring on the outer gimbal is connected and one of the brushes for the commutator; a source of electrical energy having its end terminals respectively to the brush contacts for each pair of semicircular contact segments; a shunt circuit connected at its ends to the two slip rings on the outer gimbal support to which the two electrical conductors to the contact brushes for the pairs of semicircular contacts are connected; a pair of electrical resistances in said shunt circuit; an electrical connection between the other brush of the commutator and the shunt circuit, intermediate the two resistances, whereby tilt of the outer gimbal from a predetermined reference position in one direction or the other establishes circuit closing connections between the servomotor means and one or the other of the brush contacts on the outer gimbal support for the pairs of semicircular contact segments; signal pick-off means between the outer gimbal and the outer gimbal support, surrounding the outer gimbal tilt axis, comprising a potentiometer coil fixed on the outer gimbal support; a slip ring fixed on the outer gimbal on its tilt axis having a slider disposed in contact with the last mentioned potentiometer coil; a pair of electrical conductors connected to the opposite ends of the potentiometer coil on the outer gimbal support; each conductor being connected to one of the remaining slip rings on the outer gimbal support; a contact brush fixed on the outer gimbal support in sliding contact with the last mentioned slip ring on the outer gimbal; an electrical conductor connected between last mentioned contact brush and the remaining slip ring on the outer gimbal support; a tilt determining member having an electrical energizing circuit and a pair of electrical input conductors; a source of electrical energy having one terminal thereof connected to one of the last mentioned connectors; a contact brush fixed relative on the outer gimbal support in contact with the slip ring that is connected to one end of the potentiometer coil between the outer gimbal and outer gimbal support, said last mentioned brush being connected to one of the conductors of the tilt determining member; a second relatively fixed brush disposed in slider contact with the slip ring on the outer gimbal support that is connected to the slider brush for the potentiometer between the outer gimbal and outer gimbal support and connected at its opposite end to the other electrical input conductor to the tilt determining member; a third relatively fixed brush disposed in contact with the slip ring that is connected to the other end of the potentiometer coil between the outer gimbal and outer gimbal support and an electrical conductor between the last mentioned brush and one terminal of the last mentioned source of electrical energy.

STEPHEN JOSEPH O'NEIL.

References Cited in the file of this patent

UNITED STATES PATENTS

| Number | Name | Date |
|---|---|---|
| 2,469,782 | Phair | May 10, 1949 |
| 2,584,876 | Haskins | Feb. 5, 1952 |